Nov. 29, 1966 H. F. DICKSON, JR., ET AL 3,289,198

TRANSLATOR-DISPLAY DEVICE

Filed Nov. 18, 1963 6 Sheets-Sheet 1

INVENTORS
Herbert F. Dickson, Jr. &
Elmer O. Stone
BY
Robert E. Strauser
ATTORNEY INVENTORS
Herbert F. Dickson, Jr. &
Elmer O. Stone
BY
Robert C. Strauser
ATTORNEY INVENTORS
Herbert F. Dickson, Jr. &
Elmer O. Stone
BY
Robert E. Strauser
ATTORNEY INVENTORS
Herbert F. Dickson, Jr. &
Elmer O. Stone
BY
Robert E. Strauss
ATTORNEY Photoconductive Element Electroluminescent Element INVENTORS
Herbert F. Dickson, Jr. &
Elmer O. Stone
BY
Robert E. Strauser
ATTORNEY United States Patent Office 3,289,198

Patented Nov. 29, 1966

3,289,198

TRANSLATOR-DISPLAY DEVICE

Herbert F. Dickson, Jr., and Elmer O. Stone, Seneca Falls, N.Y., assignors to Sylvania Electric Products Inc., a corporation of Delaware Filed Nov. 18, 1963, Ser. No. 324,547
5 Claims. (Cl. 340—324)

This invention relates to an integrated information conversion display device and more particularly to a packaged combination of an electroluminescent-photoconductor translator and an electroluminescent display device whereby bindary input information is converted to a numeric readout display.

In certain types of electronic instrumentation systems information input signals expressed in a certain code are translated or converted to output signals of a different code. As for example, in many computer applications electric input signals representative of a binary system are converted in a translator switching network to emerge as visual numeric representations. Very often the necessary equipment is bulky or of multi-unit construction having multitudinous interconnections which lessens performance reliability and hinders the utilization of such equipment in compact environments.

Accordingly, an object of this invention is to reduce the aforementioned disadvantages by providing a unitized structure combining an electroluminescent-photoconductor translator and an electroluminescent readout display into a compactly integrated package.

Another object is to provide a unitized translator having a plurality of interrelated laminations and numerous electrical interconnections compactly disposed on a single insulative substrate.

Still another object is the provision of compact and simplified means for simultaneously achieving a plurality of reliable electrical connections between associated parts.

A further object is to provide a compactly packaged device having features of rugged construction, versatility of usage, and ease of installation.

The foregoing objects are achieved in one aspect of the invention by the provision of a laminated electro-luminescent-photoconductor translator, disposed on a single substrate, suited to receive binary input information, and convert it to signals of the type adapted for an electro-luminescent display in a contiguously related device. The combination of the translator and readout and interconnecting laminated circuitry is suitably integrated into a single compact package of rugged design having high reliability of performance.

For a better understanding of the present invention, together with other and further objects, advantages, and capabilities thereof, reference is made to the following disclosure and appended claims in connection with the accompanying drawings in which:

Figure 1:
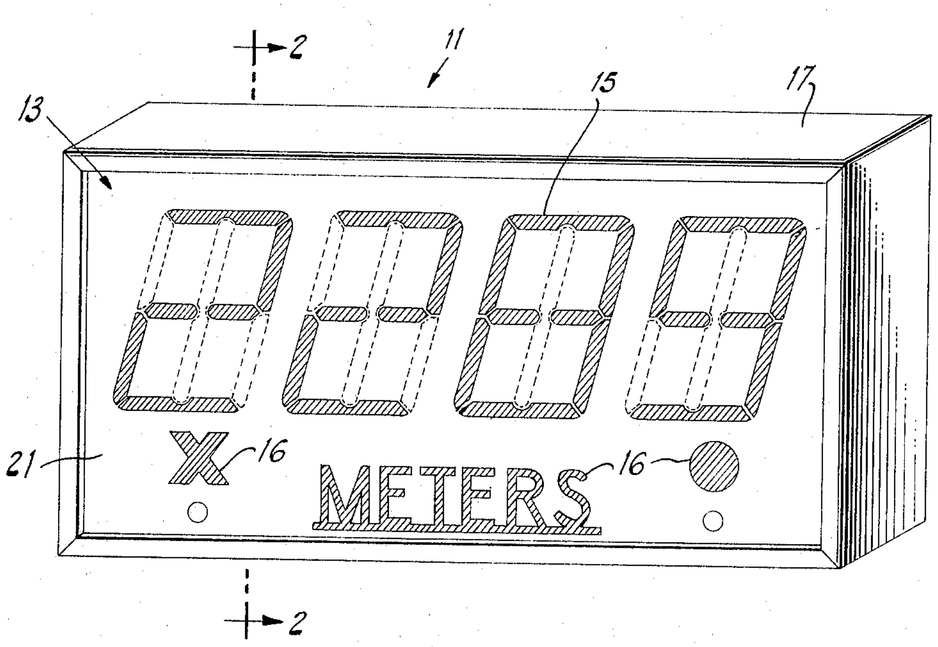
FIGURE 1 is an illustration showing an external perspective view of the packaged translator-display device.

There is shown in FIGURE 1 a packaged electroluminescent-photoconductor translator-display device 11 having a viewing area 13 on a light permeable glass 21 through which visible manifestations of four activated numerics 15 and other informative configurations 16 may be displayed. The device 11 is contained within a suitable case or frame 17 to produce a completely integrated compact package.

Figure 2:
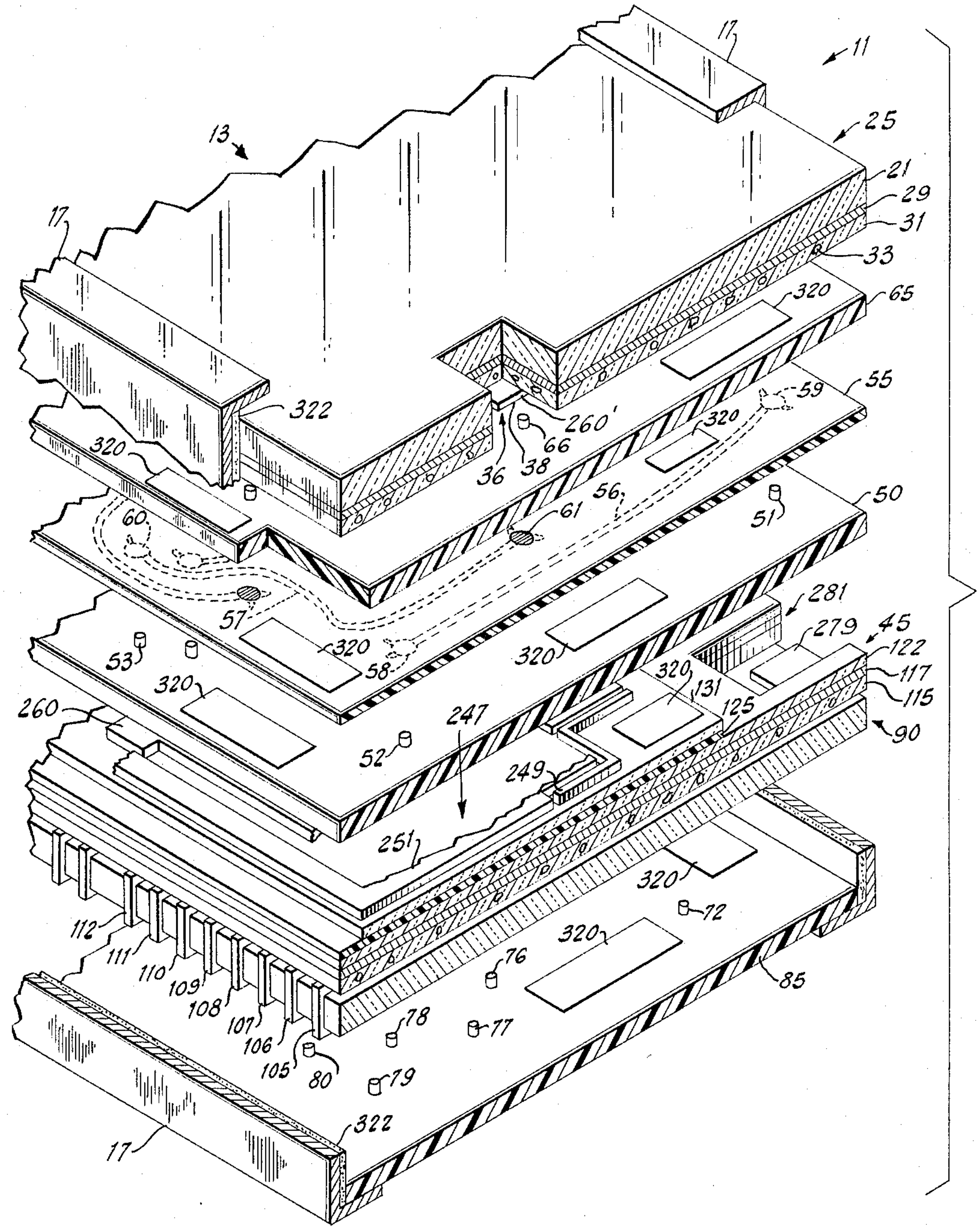
FIGURE 2 is an exploded perspective view of the device taken along line 2—2 of FIGURE 1.

In greater detail, FIGURE 2 shows an exploded view of the laminated inner construction of the device as contained within case 17. The viewing area 13 is the outer surface of the light permeable glass forming the substrate 21 of electroluminescent readout display 25. The inner surface of the substrate has dispersed thereon a light permeable first electrode 29 as of tin oxide. Adjacent to the first electrode is an electroluminescent dielectric layer 31 as of glass or plastic having dispersed therein particles of an electric field responsive phosphor 33 such as copper activated zinc sulfide or other materials of similar responsive nature. A plurality of second electrodes 36 in the form of individual segments comprising elements of numeric configurations are suitably disposed on the electroluminescent layer 31. These electrodes, which may be of metallic materials such as aluminum, gold or silver, have individual electrical contact areas 38. As will be fully explained later, impressing a voltage across the light permeable first electrode 29 and specific second electrode segments 36 will excite localized areas of the electroluminescent numeric configurations 15 as shown in FIGURE 1. Electrical signals for energizing specific second electrodes 36 emanate as output signals from the translator structure 45 being converted therein from binary input signals supplied from external sources shown in FIGURE 9. The output signals from translator 45 are transferred to the proper second electrode segments 36 of electroluminescent readout display 25 by means of two connector boards 50 and 65 and an electrical transfer plane 55 therebetween.

The translator connector board 50, of insulative material such as phenolic base plastic, has perpendicularly oriented therein and protruding therethrough a plurality of conductive silicone rubber plugs, of which 51, 52, and 53 are typical representations. These plugs are positioned to be in registration with the translator 45 output terminals as yet not described.

A readout connector board 65 of phenolic base insulative material, of the type utilized in translator connector board 50, has perpendicularly oriented therein and protruding therethrough a plurality of electrical conductive silicone rubber plugs 66. These plugs 66 are in registration with the respective second electrode segments 36 of electroluminescent readout lamp 25.

Figure 8:
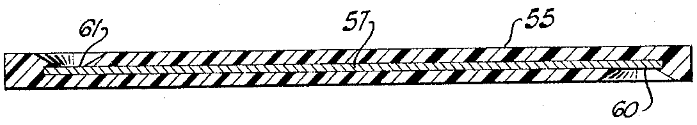
FIGURE 8 is a cross-sectional view of the electrical transfer plane.

Positioned between translator connector board 50 and readout connector board 65 is an electrical transfer plane 55 of insulative plastic material, as for example, a flexible polyester resin. As shown in FIGURES 2 and 8, this plane has embedded therein a plurality of separate electrical conductors or interconnective means such as ribbons of copper foil, of which 56 and 57 are typical representations, having the plastic material removed in discrete areas on one side as at 58, 69, 60 or on the other side at 61 thereof to provide transfer terminal areas. In this manner the transfer plane 55 facilitates, in a minimum amount of space, the proper electrical connections between the translator connector board 50 and the readout connector board 65.

The binary input signals are furnished to the translator 45 through a plurality of connector pins, of which 76, 77, 78, 79, and 80 are typical representations. These pins are perpendicularly oriented in the insulative terminal connector board 85 to protrude therethrough. The shown portions of connector pins 76, 77, 78, 79, and 80 are of conductive silicone rubber which are joined to metallic outer portions, not shown, to facilitate the introduction of external electrical binary signalling and A.C. supply and ground connections.

Figure 3:
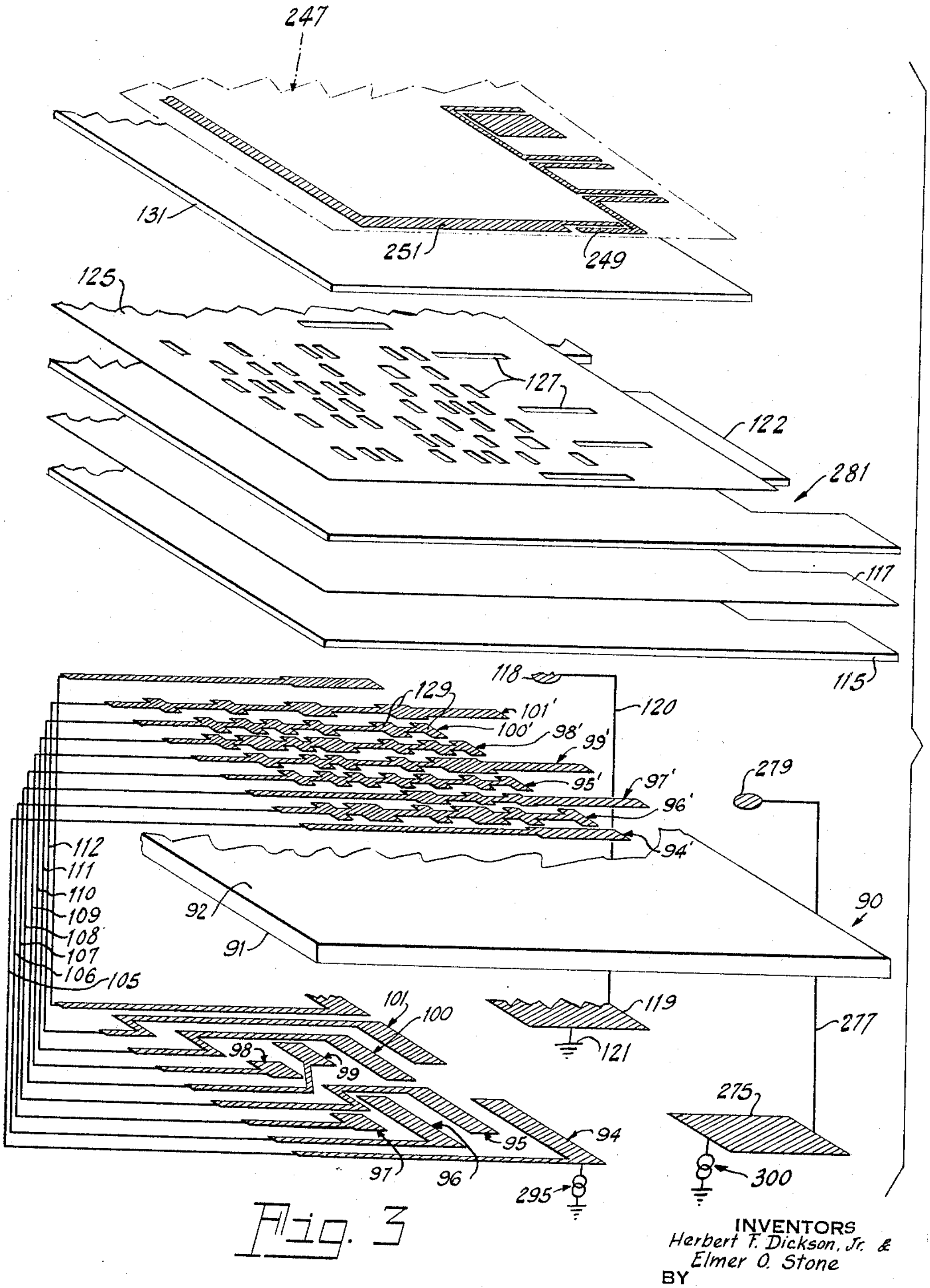
FIGURE 3 is an exploded diagrammatic view of the translator section of the device.

As shown in FIGURES 2 and 3, the construction of translator 45 is an integration of conjunctive laminations.

The translator substrate 90, of opaque insulative material such as a nontransparent glass, has discretely disposed on a first surface 91 thereof specific groups of eight binary input planar-type terminals 94 to 101 as of metal such as gold or aluminum for each binary digital grouping representative of the numerals from zero to nine. As previously mentioned and shown in FIGURE 1, the translator-display device 11 provides visible readout for four separate numeric displays each of which, as mentioned above, is dependent upon a unit of eight channels of binary input comprising four pairs of terminals representing the one, two, four and eight binary combinations. For the sake of clarity and simplicity of explanation, only the components and circuitry associated with one unit or set of eight channels of binary input signals will be detailed in this description.

As will be fully explained later, the translator is constructed to provide a pair of electroluminescent lamps ("0" and "1") for each digit of the binary representation. For example, the binary terminals 94 to 101 on the first surface of translator substrate 90 have the following binary digital designations: "1°" and "1′" are represented by terminals 96 and 97; "2°" and "2′" by terminals 99 and 98; '4°" and "4′" by terminals 101 and 100; and "8°" and "8′" by terminals 94 and 95.

On the second surface 92 of substrate 90 are disposed a series of eight parallel electrode strips 94′ to 101′ as of metal such as gold, each formed to have a plurality of areas of varying widths. These electrode strips 94′ to 101′ are electrically joined to the binary input terminals 94 to 101 disposed on the first surface 91 by plural connective means 105 to 112 as of silver spacedly disposed on the edge of substrate 90 perpendicular to the surfaces.

A layer of electric field responsive phosphors 115 such as copper activated zinc sulfide is contiguously disposed over the electrode strips, immediately followed by a transparent electrically conductive layer 117, as for example, tin oxide. A first ground conductive terminal 119 is disposed on the first surface 91 of opaque substrate 90 being spaced from the binary input terminals. This first ground conductive terminal is connected to the transparent electrically conductive layer 117 at a jointure area 118 by first ground connective means 120. It is clearly evident that a plurality of eight strip-like electroluminescent lamps, separately excitable by binary input supply signals, are formed by electrode strips 94′ to 101′, the transparent electrically conductive ground connected layer 117 and the phosphor layer 115 therebetween, thus providing the electroluminescent or light producing section of the translator 45.

Figures 4, 6, 7:
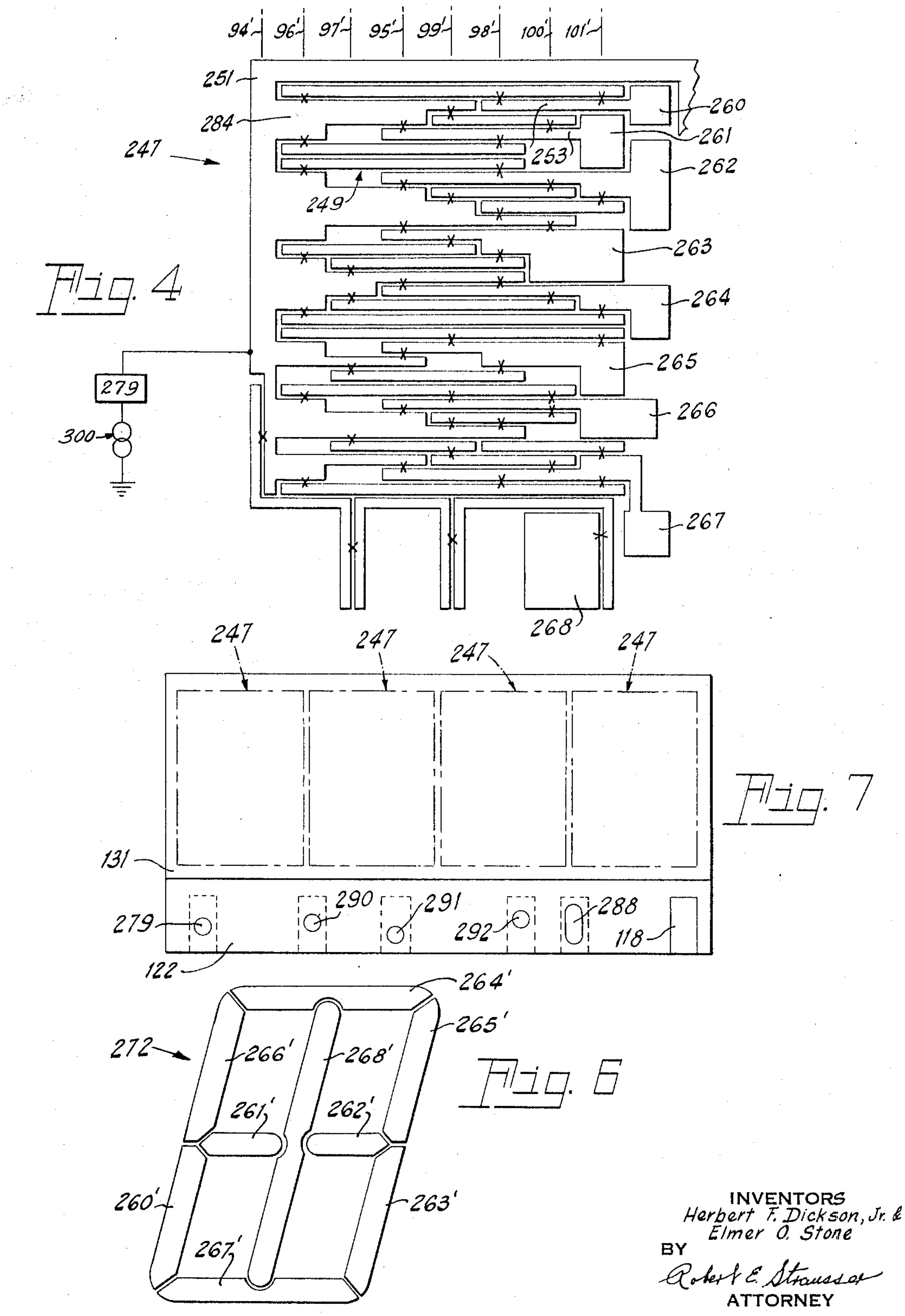
FIGURE 4 is a planar view showing the matrix network of translator electrodes associated with one numeric readout display.
FIGURE 6 illustrates the segmented layout of a numeric readout configuration.
FIGURE 7 is a planar view illustrating the layout orientation evidenced on the top of the laminated translator construction.

An insulative layer 122 of transparent material such as light permeable glass frit is placed in contiguous overlay relationship with conductive layer 117 to electrically insulate the electroluminescent section of the translator from the laminations to be placed thereupon. A mosaic layer 125 of insulative material such as black frit, having opacity except for a plurality of discretely oriented apertures 127 therein, is disposed over the transparent insulative layer 122. The apertures 127 are in registration with the wide areas 129 on electrode strips 94′ to 101′ thereby providing a plurality of electroluminescent windows or elements 141 to 243. A photoconductive layer 131 of cadmium sulfide material is overlaid the whole of mosaic layer 125 thereby covering the window-defined electroluminescent elements and providing a plurality of photoconductive elements or window gates 141′ to 243′ thereupon. As detailed in FIGURE 4, a patterned translator matrix layer 247 in the form of a plurality of defined aluminum conductive elements 249, having a common supply electrode 251, provides a discrete network of individual conductive patterns 253. Areas of electrical interconnection in the form of the photoconductive window gates 141′ to 243′ joining sections of these circuit patterns to provide electrical connections with the common supply electrode 251 are selectively activated to electrical conduction by their respective associated electroluminescent windows or elements 141 to 243 therebeneath. These electroluminescent windows and the superimposed photoconductive window gates are shown as a plurality of "x's" in FIGURE 4, while in FIGURE 5 they are individually notated in their respective circuits. The individual conductive patterns 253 each have electrical terminal portions 260 to 268 respectively representing the nine connection areas for the nine corresponding segments or elements 260′ to 268′ of each numeric configuration 272 as shown in FIGURE 6. As mentioned previously, these segments 260′ to 268′ are the plurality of second electrodes 36 associated with the electroluminescent readout display 25 shown in FIGURE 2.

As shown in FIGURE 3, the electrical power connection for the common supply electrode 251 of matrix 247 is provided by a conductor supply terminal 275 as of aluminum suitably disposed on the first surface 91 of translator substrate 90. Electrical connective means 277 in the form of a strip of conductive silver is applied to the edge of substrate 90 thereby electrically joining the supply terminal 275 with a matrix supply termination area 279 disposed on the second surface 92 of the substrate. This matrix supply termination area is insulated from adjacent laminations 115, 117, and 122 by suitable cutout portions in each, such as 281 as shown in FIGURES 2 and 3. Electrical interconnection between the termination area 279 and the matrix common supply electrode 251 is provided by conductive plugs 51 and 52 in translator connector board 50 making contact with terminal areas 58 and 59 of transfer conductor 56 in electrical transfer plane 55, as illustrated in FIGURE 2.

Figure 9:
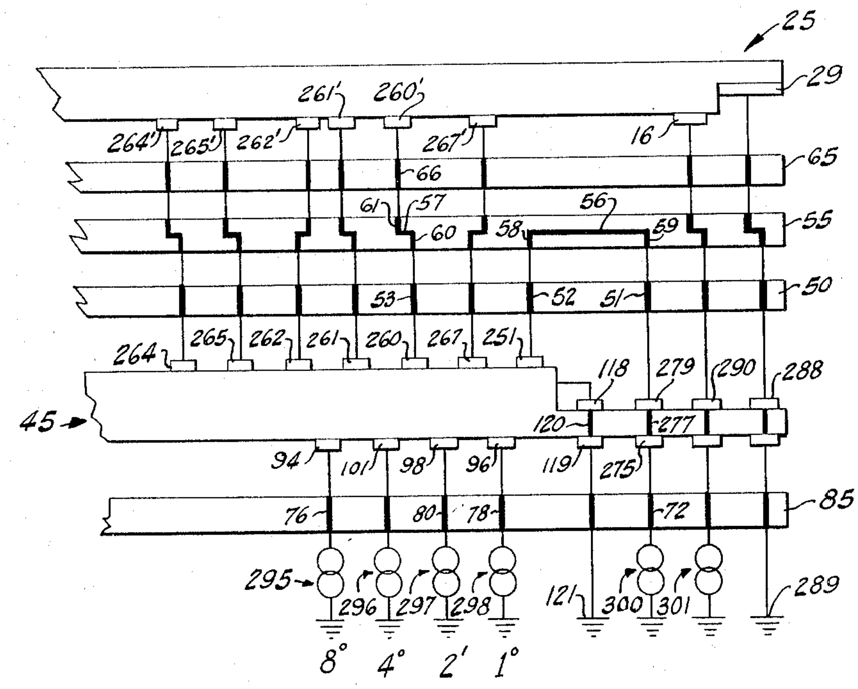
FIGURE 9 is a partial cross-sectional schematic of the device.

In FIGURE 1 there is shown the viewing area 13 through which four numerics may be visible upon the excitation of electroluminescent phosphors therebeneath. In addition to the numerics, other information 16 such as "*x*," "meters," and "*o*" may be visibly manifest. This information does not require translations from binary input but is fed as a 200 v. 1600 c.p.s. signal from an external supply 301 through the device 11, bypassing the translator section, to a discretely patterned second electrode of the readout display 25 as shown in FIGURE 9. Electrical connections for these specific signals bypass the translator in a manner similar to that provided for the matrix common supply by terminal 275, substrate edge connective means 277, and termination area 279 disposed on the second surface 92 of translator substrate 90. FIGURE 7 details the layout orientation as evidenced on the top of the laminated translator construction, whereon the four translator matrices 247, one for each numeric, are shown. Six termination areas are likewise shown. Area 118 connects the transparent electrically conductive layer 117 (see FIGURE 3) with connective means 120 to ground terminal 119 on the first surface 91 of substrate 90 and thence to an external ground 121. The matrix supply termination area 279 has been previously described. Readout lamp first electrode ground termination area 288 has associated connective construction similar to that described for matrix termination area 279, and the same is true for "*x*," "meters," and "*o*" supply termination areas 290, 291, and 292 respectively.

In FIGURE 1, the left-hand numeric display delineates the numeral "2". The functioning of device 11 to produce this particular readout display will be described. In referring to FIGURE 6 the second electrode segments of the readout display to be activated to produce the numeral "2" are segments 264′, 265′, 262′, 261′, 260′, and 267′ respectively. These particular segments are also indicated in FIGURE 9.

The binary input information for the numeral "2" are signals representative of 0010 or 8°, 4°, 2′, and 1°. Individual signals from 200 v., 1600 c.p.s. sources 295 to 298 are fed to binary input supply terminals 94, 101, 98, and 96. Refer to FIGURES 3 and 9. These signals are carried to electrode strips 94′, 101′, 98′, and 96′ on the second surface of the translator substrate 90. The binary input ground connection is made to terminal 119 which is connected at 118 to transparent conductive layer 117. The circuit is thus completed to excite the electric field responsive phosphors in layer 115 adjacent the electrode strips 94′, 101′, 98′, and 96′ causing light to shine through the apertures 127 in opaque mosaic layer 125 thereby providing a plurality of lighted electroluminescent window elements to activate discrete areas of the photoconductive layer 131 thereabove.

Figure 5:
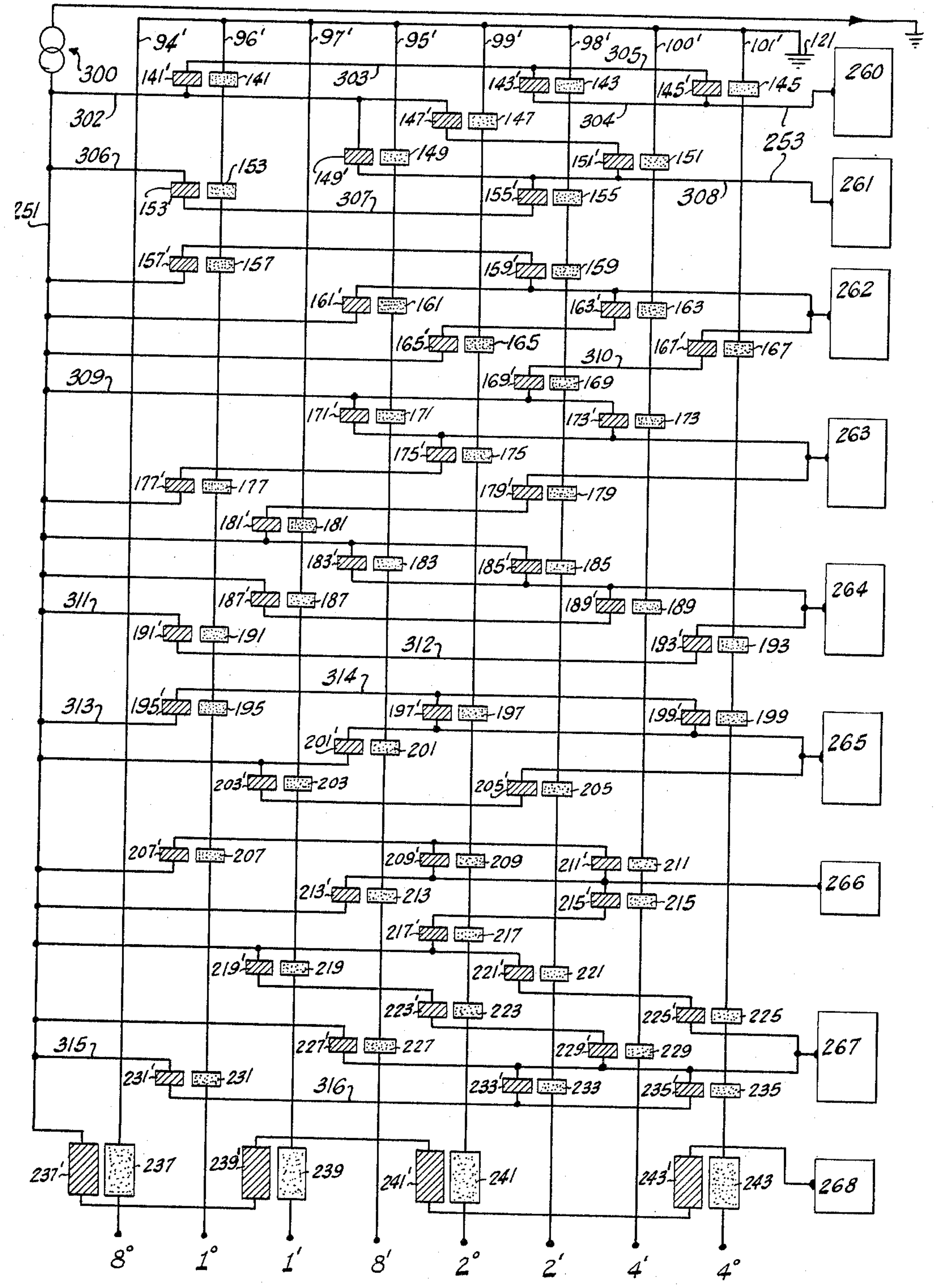
FIGURE 5 is a schematic of the translator network as shown in FIGURE 4.

With reference to FIGURES 4 and 5, the translator matrix 247 overlaying the photoconductive layer 131 has a common supply electrode 251 which is connected to matrix signal source 300 supplying 200 v. of 1600 c.p.s. power thereto. The connection components have been described and are shown in FIGURES 2, 3 and 9. Voltage for the readout lamp second electrode segments 264′ 265′, 262′, 261′, 260′, and 267′ is supplied from the matrix common supply electrode 251, therefore, electrical connections must be made within the matrix to activate matrix terminal portions 264, 265, 262, 261, 260 and 267. These matrix interconnections are achieved by the functioning of discrete pairs of electroluminescent window elements and associated photoconductive window gates.

In FIGURE 5, as previously mentioned, electrode strips 94′, 96′, 98′, and 101′ have binary signalling applied thereto to excite the electroluminescent window elements associated with each. These elements in turn activate the superimposed photoconductive window gates to a state of electrical conduction thereby bridging specific gaps in the various circuits of the matrix network. To expedite the description of the various matrix circuits the terminology relating to the numerous electroluminescent windows and their associated photoconductive window gates will be shortened to "EL–PC gates."

The matrix terminal 260 is joined to the common supply electrode 251 through the circuit comprising conductor 302, EL–PC gate 141–141′, conductor 303, EL–PC gate 143–143′, and conductor 304. Since EL–PC gate 145–145′ is also activated, the connection can also be made along conductor 305.

Matrix terminal 261 is connected to supply electrode 251 by circuitry comprising conductor 306, EL–PC gate 153–153′, conductor 307, EL–PC gate 155–155′, and conductor 308.

The matrix terminal 262 has connection with electrode 251 through conductor 309, EL–PC gate 169–169′, along conductor 310 through EL–PC gate 167–167′.

Terminal 264 is joined to the common supply electrode 251 through conductor 311, EL–PC gate 191–191′, along conductor 312 and thence through EL–PC gate 193–193′.

Matrix terminal 265 has connection with supply electrode 251 along conductor 313, through EL–PC gate 195–195′, thence along conductor 314 and through EL–PC gate 199–199′.

Terminal 267 is connected to supply electrode 251 by conductor 315, EL–PC gate 231–231′, conductor 316 and EL–PC gate 235–235′. Thus, six distinct circuit paths are completed between the common matrix supply electrode 251 and the specific matrix terminals 264, 265, 262, 261, 260, and 267 thereby providing converted output signalling to six specific translator output signal terminals.

As previously mentioned, conductive rubber plugs in the translator connector board 50 make contact with the above-described translator output signal terminals and extend the circuit paths through the electrical transfer plane 55 and the adjacent readout connector board 65 wherein conductive rubber plugs make connection with the specific second electrode segments of the electroluminescent readout display 25. An example of this connective circuitry can be traced in FIGURE 2. Matrix output terminal 260 is contacted by conductive rubber plug 53 in translator connector board 50 which is in registration to contact terminal area 60 in transfer plane 55. This terminal area is an integral part of transfer conductor 57 which terminates in another terminal area 61 projecting upwardly in registration with conductive rubber plug 66 in the readout connector board 65. Plug 66 is oriented to contact the second electrode segment 260′ of the electroluminescent readout display 25. In a similar manner, the other matrix output terminals are connected to the proper readout second electrode segments. By like fashion, the ground connection of the first electrode 29 of readout display 25 is made with its ground termination area 288 on the top surface of the translator 45 as shown in FIGURE 7, and being connected to an external ground 289 as indicated in FIGURE 9. The supply and ground connections being thus completed, the voltage impressed thereacross via the matrix output terminals excites specific areas of the electric field responsive phosphors 33 in the electroluminescent dielectric layer 31 of the readout display 25 and produces a visible numeral "2" readout configuration on viewing area 13 as illustrated in FIGURE 1.

Assembly of the device structure as shown in FIGURE 2 is facilitated by discretely placing attachment means such as pieces of double sided adhesive tape 320 between the terminal connector board 85 and the first surface 91 of the translator substrate 90 in the areas free of electrical connections. In like manner, pieces of tape 320 are positioned between the top of the translator 45 and the translator connector board 50, between the connector board 50 and the transfer plane 55, between the plane 55 and the readout connector board 65, and between connector board 65 and the bottom of the electroluminescent readout display 25. With all components and connective laminations in registration, the structure is clamped together, by removable clamps not shown, to effect adequate pressured electrical contact between the multitude of connective rubber plugs and the numerous contact areas. A moisture resistant seal 322, in the form of a high temperature wax, is then perimetrically disposed around the edge of the device bonding the various laminated components together in a sealed unitized assembly after which the pressurizing clamps are removed. A protective frame, formed to provide circumscribing peripheral engagement with the sealed device, completes the unitized assembly.

There is thus provided a unitized structure combining an electroluminescent-photoconductor translator and an electroluminescent readout display into a compactly integrated package wherein binary input information is converted to a visible display of numeric readout. The translation section is compactly disposed on a single insulative substrate in the form a plurality of contiguous interrelated laminations with integrated electrical interconnections. The use of conductive rubber contacts makes possible the simultaneous and permanent achievement of a plurality of reliable electrical connections between associated parts; while use of the flexible transfer plane further promotes compactness. The sealed and framed unit results in a compactly packaged translator-display device that has reliability, ruggedness, and versatility of usage that has been heretofore unachieved.

While there has been shown and described what it is at present considered the preferred embodiment of the invention, it will be obvious to those skilled in the art that various changes and modifications may be made therein without departing from the invention as defined by the appended claims.

What is claimed is:

1. A packaged electroluminescent-photoconductor laminated translator-display device for converting binary input signals to visual readout information comprising:

a substantially opaque insulative translator substrate having first and second oppositely disposed surfaces and a perimetric edge therebetween;

a plurality of binary input terminals, insulatively spaced and disposed on the first surface of said substrate and extending to said edge thereof;

a plurality of separate electrical supply and ground conductor terminals insulatively spaced and disposed on the first surface of said substrate being removed from said binary input terminals and extending to said edge thereof to provide at least a first supply conductor terminal and a first and a second ground conductor terminals;

an insulative terminal connector board having therein a plurality of connector pins oriented for contiguous registry with said binary input terminals and said supply and ground conductor terminals to facilitate individual external electrical connection therewith;

a plurality of insulatively spaced electrode strips disposed on the second surface of said substrate and extending to said edge thereof;

a plurality of electrical conductive termination areas insulatively spaced and disposed on the second surface of said translator substrate being removed from said electrode strips and extending to said edge thereof;

a first set and a second set of electrical connective means spacedly disposed on said perimetric edge perpendicular to said surfaces, said first set individually joining said binary input terminals on said first surface to said electrode strips on said second surface of said substrate, and said second set individually joining said supply and ground terminals on said first surface to said termination areas on said second surface of said substrate thereby providing at least a first supply termination area and a first and second ground termination areas on the second surface thereof;

a layer of electric field responsive phosphor disposed over said electrode strips;

a transparent electrically conductive layer disposed on said layer of electric field responsive phosphor, said conductive layer being utilized with said electrode strips and said phosphor layer therebetween to provide a plurality of strip-like electroluminescent lamps;

first ground connective means electrically joining said transparent conductive layer with the first of said ground termination areas to provide a common input ground connection for said lamps;

a transparent insulative layer overlaying said transparent electrically conductive layer;

a mosaic layer of opaque insulative material having a plurality of apertures discretely positioned therein in registration with said strip-like electroluminescent lamps to provide a plurality of electroluminescent windows;

a photoconductive layer overlaying said mosaic and covering said windows to provide a plurality of photoconductive window gates thereon;

a translator matrix layer in the form of a plurality of conductive elements, having a common supply electrode, providing discrete network of individual conductive patterns having areas of electrical interconnection therebetween in the form of said photoconductive gates, said patterns having individual electrical terminal portions;

a translator connector board having first and second surfaces and electrical connective plugs extending perpendicularly therein and having ends protruding therethrough, said ends protruding from said first surface being in registration with said matrix pattern terminal portions;

an electrical transfer plane having first and second surfaces with transfer terminal areas thereon and electrical interconnective means extending nonperpendicularly therethrough, said transfer terminal areas on said first transfer surface being in registry with said connective plugs protruding from said second surface of said translator connector board, said plane and said translator connector board having first common electrical supply conductive means joining said common supply electrode of said translator matrix with said first supply termination area;

a planarly-layered electroluminescent readout display sequentially comprising a substantially light permeable insulative substrate, a light permeable first electrode, a layer of electroluminescent phosphor, and a plurality of second electrodes disposed as individual segments comprising elements of readout information;

first electrode connective means joining said light permeable first electrode of said electroluminescent readout display with the second of said ground termination areas;

a readout connector board having first and second surfaces and electrical connective plugs extending perpendicularly therein and having ends protruding therethrough, the ends of said electrical connective plugs protruding from said first surface of said readout connector board being in registration with said transfer terminal areas on said second surface of said transfer plane, and the ends of said electrical connective plugs protruding from said second surface of said readout connector board being in registration for electrical engagement with said plurality of second electrodes of said planarly-layered electroluminescent readout display;

a moisture resistant seal disposed to provide integral peripheral bonding of said terminal connector board, said translator substrate and said layers thereon, said connector boards, said transfer plane and said planarly-layered electroluminescent readout display, thereby forming a sealed unitized assembly; and a frame formed to provide circumscribing peripheral engagement with said unitized assembly.

2. A packaged electroluminescent-photoconductor laminated translator-display device for converting binary input signals to visual readout information comprising:

a substantially opaque insulative translator substrate having first and second oppositely disposed surfaces and a perimetric edge therebetween;

a plurality of binary input terminals, insulatively spaced and disposed on the first surface of said substrate and extending to said edge thereof;

a plurality of separate electrical supply and ground conductor terminals insulatively spaced and disposed on the first surface of said substrate being removed from said binary input terminals and extending to said edge thereof to provide at least a first supply conductor terminal and a first and second ground conductor terminals;

an insulative plastic terminal connector board having therein a plurality of connector pins extending interiorly to exteriorly therethrough and oriented for contiguous registry with said binary input terminals and said supply and ground conductor terminals to facilitate individual external electrical connection therewith, said connector pins having second surface portions of conductive rubber formed for pressured electrical engagement with said terminals on said first surface of said translator substrate;

a plurality of electrode strips insulatively spaced and parallelly disposed on the second surface of said substrate and extending to said edge thereof;

a plurality of electrical conductive termination areas insulatively spaced and disposed on the second surface of said translator substrate being removed from said electrode strips and extending to said edge thereof;

a first set and a second set of electrical connective means spacedly disposed on said perimetric edge perpendicular to said surfaces, said first set individually joining said binary input terminals on said first surface to said electrode strips on said second surface of said substrate, and said second set individually joining said supply and ground terminals on said first surface to said termination areas on said second surface of said substrate thereby providing at least one supply termination area and a first and second ground termination areas on the second surface thereof;

a layer of electric field responsive phosphor disposed over said electrode strips;

a transparent electrically conductive layer disposed on said layer of electric field responsive phosphor, said conductive layer being utilized with said electrode strips and said phosphor layer therebetween to provide a plurality of strip-like electroluminescent lamps;

first ground connective means electrically joining said transparent conductive layers with the first of said ground termination areas to provide a common input ground connection for said lamps;

a transparent insulative layer overlaying said transparent electrically conductive layer;

a mosaic layer of opaque insulative material having a plurality of apertures discretely positioned therein in registration with said strip-like electroluminescent lamps thereby providing a plurality of electroluminescent windows;

a photoconductive layer overlaying said mosaic and covering said windows to provide a plurality photoconductive window gates thereon;

a translator matrix layer in the form of a plurality of conductive elements, having a common supply electrode, providing discrete network of individual conductive patterns having areas of electrical interconnection therebetween in the form of said photoconductive gates, said patterns having individual electrical terminal portions;

a plastic translator connector board having first and second surfaces and electrical conductive rubber plugs extending perpendicularly therein and having ends protruding therethrough, said ends protruding from said first surface being in registration with said matrix pattern terminal portions;

an electrical transfer plane having first and second surfaces with transfer terminal areas thereon and electrical interconnective means extending nonperpendicularly therethrough, said transfer terminal areas on said first transfer surface being in registry and pressured engagement with said conductive rubber plugs protruding from said second surface of said translator connector board, said plane and said translator connector board having first common electrical supply conductive means joining said common supply electrode of said translator matrix with said first supply termination area;

a planarly-layered electroluminescent readout display sequentially comprising a substantially light permeable insulative substrate, a light permeable first electrode, a layer of electroluminescent phosphor, and a plurality of second electrodes disposed as individual segments comprising elements of readout information;

first electrode connective means joining said light permeable first electrode of said electroluminescent readout display with the second of said ground termination areas;

a plastic readout connector board having first and second surfaces and electrical conductive rubber plugs extending perpendicularly therein and having ends protruding therethrough, the ends of said electrical conductive rubber plugs protruding from said first surface of said readout connector board being in registration and pressured engagement with said transfer terminal areas on said second surface of said transfer plane, and the ends of said electrical conductive rubber plugs protruding from said second surface of said readout connector board being in registration and pressured electrical engagement with said plurality of second electrodes of said planarly-layered electroluminescent readout display;

attachment means for joining said translator, said connector boards, said transfer plane, and said readout display to form an integrated device;

a moisture resistant seal disposed to provide integral peripheral bonding of said terminal connector board, said translator substrate and said layers thereon, said connector boards, said transfer plane and said planarly-layered electroluminescent lamp, thereby forming a sealed unitized assembly; and a frame formed to provide circumscribing peripheral engagement with said unitized assembly.

3. An integrated electroluminescent-photoconductor laminated translator-display device for converting binary input signals to visual readout information on a discretely patterned electroluminescent readout display comprising:

an insulative translator substrate having first and second oppositely disposed surfaces and a perimetric edge therebetween;

a plurality of binary input supply terminals, insulatively spaced and disposed on the first surface of said substrate and extending to said edge thereof;

a plurality of separate electrical supply and ground conductor terminals insulatively spaced and disposed on the first surface of said substrate being removed from said binary input terminals and extending to said edge thereof to provide at least a first supply conductor terminal and a first and a second ground conductor terminals;

a plurality of insulatively spaced electrode strips disposed on the second surface of said substrate and extending to said edge thereof;

a plurality of electrical conductive termination areas insulatively spaced and disposed on the second surface of said translator substrate being removed from said electrode strips and extending to said edge thereof;

a first set and a second set of electrical connective means spacedly disposed on said perimetric edge perpendicular to said surfaces, said first set individually joining said binary input supply terminals on said first surface to said electrode strips on said second surface of said substrate and said second set individually joining said supply and ground terminals on said first surface to said termination areas on said second surface of said substrate thereby providing at least a first supply termination area and first and second ground termination areas on the second surface thereof;

a layer of electric field responsive phosphor disposed over said electrode strips;

a transparent electrically conductive layer disposed on said layer of electric field responsive phosphor said conductive layer being utilized with said electrode strips and said phosphor layer therebetween to provide a plurality of strip-like electroluminescent lamps;

first ground connective means electrically joining said transparent conductive layer with the first of said ground termination areas to provide a common input ground connection for said lamps;

a transparent insulative layer overlaying said transparent electrically conductive layer;

a mosaic layer of opaque insulative material having a plurality of apertures discretely positioned therein in registration with said strip-like electroluminescent lamps to provide a plurality of electroluminescent windows;

a photoconductive layer overlaying said mosaic and covering said windows to provide a plurality of photoconductive window gates thereon;

a translator matrix layer in the form of a plurality of conductive elements, having a common supply electrode, providing a discrete network of individual conductive patterns having areas of electrical interconnection therebetween in the form of said photoconductive gates, said patterns having individual electrical terminal portions;

an electrical transfer plane of insulative material having first and second surfaces with electrical transfer conductors embedded therein and extending nonperpendicularly therethrough with each end thereof emerging as a transfer terminal area at one of said surfaces;

translator connective means electrically connecting said translator terminal portions with transfer terminal areas disposed on said first surface of said transfer plane;

a planarly-layered electroluminescent readout display superjacently disposed relative to said electrical transfer plane and having a plurality of electrode segments disposed for connection; and readout connective means oriented intermediate said readout display and said transfer plane connecting said readout electrode segments with said transfer terminal areas disposed on said second surface of said transfer plane.

4. An integrated electroluminescent-photoconductor laminated translator-display device according to claim 3 wherein said translator connective means comprises a translator connector board of insulative material having a plurality of electrically conductive plugs perpendicularly oriented therein in a manner to protrude therethrough, said plugs being discretely positioned to be in registration with said translator terminal portions to consummate contact therewith; and wherein said readout connective means comprises a readout connector board of insulative material having a plurality of electrically conductive plugs perpendicularly oriented therein in a manner to protrude therethrough, said plugs being discretely positioned to be in registration with said electrode segments of said readout display to consummate contact therewith; and wherein said terminal areas on said first surface of said electrical transfer plane are in registration with said conductive plugs in said translator connector board to consummate contact therewith, said terminal areas on said second surface of said electrical transfer plane being in registration with said conductive plugs in said readout connector board to consummate contact therewith.

5. An integrated electroluminescent-photoconductor laminated translator-display device according to claim 3 wherein said translator substrate is substantially opaque glass; said binary input, electrical supply, and ground conductor terminals are of aluminum; said electrode strips are of gold; said conductive termination areas are of aluminum; said first and second sets of electrical connective means are of silver; said transparent electrically conductive layer is of tin oxide; said transparent insulative layer is of glass; said mosaic layer is of opaque glass; said conductive patterns of said translator matrix layer and said terminal portions therefor are of aluminum; and said electrical transfer plane is of plastic.

References Cited by the Examiner

UNITED STATES PATENTS

| | | | |
|---|---|---|---|
| 2,950,418 | 8/1960 | Reis | 313—108 |
| 2,958,009 | 10/1960 | Bowerman | 340—166 X |
| 3,108,189 | 10/1963 | Bowerman | 340—166 |

OTHER REFERENCES

Greenberg, Electroluminescent Display and Logic Devices in "Electronics," March 24, 1961, pp. 31–35.

NEIL C. READ, *Primary Examiner.*

A. J. KASPER, *Assistant Examiner.*